(12) United States Patent
Asai et al.

(10) Patent No.: US 10,431,799 B2
(45) Date of Patent: Oct. 1, 2019

(54) LAYERED DOUBLE HYDROXIDE, LAYERED DOUBLE HYDROXIDE DENSE FILM, AND COMPOSITE MATERIAL

(71) Applicant: NGK INSULATORS, LTD., Nagoya-shi, Aichi (JP)

(72) Inventors: Kouta Asai, Nagoya (JP); Naomi Saito, Nagoya (JP)

(73) Assignee: NGK INSULATORS, LTD., Nagoya-shi, Aichi (JP)

( * ) Notice: Subject to any disclaimer, the term of this patent is extended or adjusted under 35 U.S.C. 154(b) by 169 days.

(21) Appl. No.: 15/724,609

(22) Filed: Oct. 4, 2017

(65) Prior Publication Data
US 2018/0040869 A1 Feb. 8, 2018
US 2018/0183029 A9 Jun. 28, 2018

Related U.S. Application Data

(63) Continuation of application No. PCT/JP2016/055435, filed on Feb. 24, 2016.

(30) Foreign Application Priority Data

Apr. 14, 2015 (JP) .................. 2015-082570

(51) Int. Cl.
*H01M 2/16* (2006.01)
*H01M 8/10* (2016.01)
(Continued)

(52) U.S. Cl.
CPC ............. *H01M 2/1686* (2013.01); *C01F 7/00* (2013.01); *C01F 7/005* (2013.01); *C01G 3/006* (2013.01);
(Continued)

(58) Field of Classification Search
CPC ........ C01F 7/00; C01F 7/005; C01P 2002/08; C01P 2002/22; C01G 3/006; C01G 9/006;
(Continued)

(56) References Cited

U.S. PATENT DOCUMENTS

2014/0227616 A1 8/2014 Yamada et al.
2014/0315099 A1 10/2014 Yamada et al.
(Continued)

FOREIGN PATENT DOCUMENTS

EP 2782185 A1 9/2014
EP 3235789 A1 10/2017
(Continued)

OTHER PUBLICATIONS

International Search Report for PCT/JP2016/055435 (5 pgs).
Written Opinion for PCT/JP2016/055435 (10 pgs).
MgCoAl-LDH derived heterogeneous catalysts for the ethanol transesterification of canola oil to biodiesel, by Eugena Li et al, Applied Catalysis B: Environmental, vol. 88, No. 1-2, 2009, pp. 42-49.
(Continued)

*Primary Examiner* — Brittany L Raymond
(74) *Attorney, Agent, or Firm* — Flynn Thiel, P.C.

(57) ABSTRACT

The present invention provides a layered double hydroxide with improved conductivity, a layered double hydroxide and a composite material containing the layered double hydroxide. The layered double hydroxide is represented by the general formula: $[Mg^{2+}_{(1-y)}M1^{\alpha+}_{y}]_{1-x}[Al^{3+}_{(1-z)}M2^{\beta+}_{z}]_{x}(OH)_{2}A^{n-}_{x/n} \cdot mH_{2}O$, wherein $0.1 \leq x \leq 0.4$, $0 \leq y \leq 0.95$, and $0 \leq z \leq 0.95$, provided that both y and z are not 0 at the same time; $\alpha = 1$ or 2; $\beta = 2$ or 3; $A^{n-}$ is an n-valent anion, provided that n is an integer of 1 or greater; $m \geq 0$; $M1^{\alpha+}$ is a cation of at least one substituent element selected from monovalent elements, transition metal elements, and other elements with an ionic radius greater than that of $Mg^{2+}$; and $M2^{\beta+}$ is a cation of at least one element selected from divalent elements, transition metals, and other elements with an ionic radius greater than that of $Al^{3+}$.

12 Claims, 5 Drawing Sheets

(51) Int. Cl.
| | |
|---|---|
| *C01F 7/00* | (2006.01) |
| *C01G 49/00* | (2006.01) |
| *C01G 51/00* | (2006.01) |
| *C01G 53/00* | (2006.01) |
| *C01G 45/00* | (2006.01) |
| *C01G 3/00* | (2006.01) |
| *C01G 9/00* | (2006.01) |
| *H01M 4/86* | (2006.01) |
| *H01M 8/02* | (2016.01) |
| *H01M 12/08* | (2006.01) |

(52) U.S. Cl.
CPC ........... *C01G 9/006* (2013.01); *C01G 45/006* (2013.01); *C01G 49/009* (2013.01); *C01G 51/006* (2013.01); *C01G 53/006* (2013.01); *H01M 8/10* (2013.01); *C01P 2002/08* (2013.01); *C01P 2002/22* (2013.01); *H01M 4/86* (2013.01); *H01M 8/02* (2013.01); *H01M 12/08* (2013.01); *Y02E 60/128* (2013.01)

(58) Field of Classification Search
CPC .. C01G 45/006; C01G 49/009; C01G 51/006; C01G 53/006; H01M 4/86; H01M 8/02; H01M 8/10; H01M 12/08; H01M 2/1686; Y02E 60/128
See application file for complete search history.

(56) References Cited

U.S. PATENT DOCUMENTS

| | | |
|---|---|---|
| 2015/0225252 A1 | 8/2015 | Saito et al. |
| 2016/0159659 A1 | 6/2016 | Zhang et al. |

FOREIGN PATENT DOCUMENTS

| | | |
|---|---|---|
| JP | 2010-059005 A | 3/2010 |
| JP | 2013-191523 A | 9/2013 |
| WO | WO 2013/073292 A1 | 5/2013 |
| WO | WO 2013/118561 A1 | 8/2013 |
| WO | WO 2014/156578 A1 | 10/2014 |
| WO | WO 2015/012078 A1 | 1/2015 |

OTHER PUBLICATIONS

Structure and morphology of Mg—Al—Fe-mixed oxides derived from layered double hydroxides, by T. Vulic et al, Journal of Microscopy, vol. 232, No. 3, 2008, pp. 634-638.

Extended European Patent Office Search Report for corresponding Application No. 16779822.2, dated Oct. 30, 2018 (11 pages).

Metal containing layered double hydroxides as efficient catalyst precursors for the selective conversion of acetone, by R. Unnikrishnan et al, Journal of Molecular Catalysis A: Chemical, vol. 144, 1999, pp. 173-179.

Fabrication of Fe3+ doped Mg/Al layered double hydroxides and their application in UV light-shielding coatings, by X. Wang et al, Journal of Materials Chemistry C, vol. 2, No. 29, 2014, pp. 5752-5758.

LAYERED DOUBLE HYDROXIDE, LAYERED DOUBLE HYDROXIDE DENSE FILM, AND COMPOSITE MATERIAL

CROSS-REFERENCE TO RELATED APPLICATIONS

This application is a continuation application of PCT/JP2016/055435 filed Feb. 24, 2016, which claims priority to Japanese Patent Application No. 2015-082570 filed Apr. 14, 2015, the entire contents all of which are incorporated herein by reference.

BACKGROUND OF THE INVENTION

1. Field of the Invention

The present invention relates to layered double hydroxide, layered double hydroxide dense membrane, and composite material.

2. Description of the Related Art

Layered double hydroxides (hereinafter referred to as LDHs), such as hydrotalcite, are compounds that contain exchangeable anions between hydroxide layers. To make use of their characteristics, LDHs have been used as catalysts and absorbents, as well as dispersants in polymers in order to improve heat resistance of the polymers. In addition, LDHs have recently been attracting attention as materials that exhibits hydroxide ion conductivity, and studied for use as electrolytes in alkaline fuel cells or additives in catalytic layers of zinc-air batteries.

Zinc secondary batteries, such as nickel-zinc or zinc-air secondary batteries, including hydroxide-ion-conductive ceramic separators composed of LDHs have been proposed. In other words, use of LDH separators has been proposed in order to solve the problem of traditional nickel-zinc or zinc-air secondary batteries, that is, short circuit occurring between negative and positive electrodes due to formation of zinc dendritic crystals or dendrites by zinc in the negative electrode during a charge mode of the batteries and break the separators. For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is layered double hydroxide (LDH) having a basic composition represented by the general formula: $M^{2+}_{1-x}M^{3+}_x(OH)_2 A^{n-}_{x/n} \cdot mH_2O$ (wherein $M^{2+}$ represents at least one divalent cation, $M^{3+}$ represents at least one trivalent cation, $A^{n-}$ represents an n-valent anion, n is an integer of 1 or more, and x is 0.1 to 0.4). Patent Document 2 (WO2013/073292) discloses a zinc-air secondary battery including a separator that is composed of layered double hydroxide (LDH) having the above basic composition and is in tight contact with one side of an air electrode in order to prevent both the short circuit between positive and negative electrodes caused by dendritic zinc during the charge mode of the battery and contamination of an electrolytic solution with carbon dioxide.

Both Patent Documents 1 and 2 state that preferred are Mg—Al layered double hydroxides (LDHs) represented by the general formula: $M^{2+}_{1-x}M^{3+}_x(OH)_2 A^{n-}_{x/n} \cdot mH_2O$ wherein $M^{2+}$ is $Mg^{2+}$ and $M^{3+}$ is $Al^{3+}$. Patent Document 3 (JP2013-191523A) discloses an LDH electrolytic membrane represented by the general formula, wherein $M^{2+}$ is $Mg^{2+}$, $Ni^{2+}$, $Fe^{2+}$, $Co^{2+}$, or $Zn^{2+}$, $M^{3+}$ is $Al^{3+}$, $Fe^{3+}$, or $Cr^{3+}$, and $A^{n-}$ is $Cl^-$, $NO_3^-$, or $CO_3^{2-}$.

CITATION LIST

Patent Documents

Patent Document 1: WO2013/118561
Patent Document 2: WO2013/073292
Patent Document 3: JP2013-191523A

SUMMARY OF THE INVENTION

Patent Document 3 discloses a composition of substituted LDHs in which the $Mg^{2+}$ at the Mg sites are completely replaced with $Ni^{2+}$, $Fe^{2+}$, $Co^{2+}$, or $Zn^{2+}$, and/or the $Al^{3+}$ at the Al sites are completely replaced with $Fe^{3+}$ or $Cr^{3+}$, in addition to the Mg—Al LDH. According to the data disclosed in Patent Document 3, however, no composition of substituted LDH disclosed therein virtually exhibits improved $OH^-$ conductivity as compared to the Mg—Al LDH.

The inventors have now found that the conductivity of the Mg—Al LDH is significantly improved by partly replacing $Mg^{2+}$ at the Mg sites with cations of a predetermined element and/or partly replacing $Al^{3+}$ at the Al sites with cations of a predetermined element.

An object of the present invention is to provide a layered double hydroxide with improved conductivity, a layered double hydroxide and a composite material containing the layered double hydroxide.

According to one embodiment, the present invention provides a layered double hydroxide represented by the following general formula:

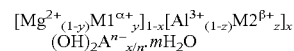
$$[Mg^{2+}_{(1-y)}M1^{\alpha+}_y]_{1-x}[Al^{3+}_{(1-z)}M2^{\beta+}_z]_x(OH)_2 A^{n-}_{x/n} \cdot mH_2O$$

wherein $0.1 \leq x \leq 0.4$, $0 \leq y \leq 0.95$, and $0 \leq z \leq 0.95$, with the proviso that both y and z are not 0 at the same time; $\alpha=1$ or 2; $\beta=2$ or 3; $A^{n-}$ is an n-valent anion, with the proviso that n is an integer of 1 or greater; $m \geq 0$; $M1^{\alpha+}$ is a cation of at least one substituent element selected from the group consisting of monovalent elements, transition metal elements, and other elements with an ionic radius greater than that of $Mg^{2+}$; and $M2^{\beta+}$ is a cation of at least one element selected from the group consisting of divalent elements, transition metal elements, and other elements with an ionic radius greater than that of $Al^{3+}$.

According to another embodiment, the invention provides a layered double hydroxide dense membrane that is a water-impermeable dense membrane containing the layered double hydroxide of the aforementioned embodiment.

According to another embodiment, the invention provides a composite material including a porous substrate and the layered double hydroxide dense membrane of the aforementioned embodiment, the layered double hydroxide membrane being disposed on at least one surface of the porous substrate.

DETAILED DESCRIPTION OF THE INVENTION

Layered Double Hydroxide

Figure 1:
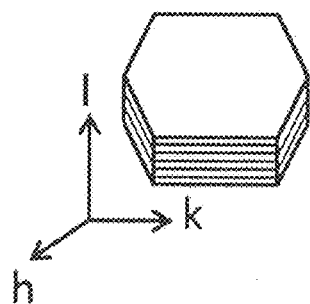
FIG. 1 is a schematic illustration of a platy particle of layered double hydroxide (LDH).

The layered double hydroxide (hereinafter, referred to as "LDH") of the present invention is represented by the following general formula: $[Mg^{2+}_{(1-y)}M1^{\alpha+}_{y}]_{1-x}[Al^{3+}_{(1-z)}M2^{\beta+}_{z}]_{x}(OH)_2 A^{n-}_{x/n} \cdot mH_2O$, wherein $0.1 \leq x \leq 0.4$, $0 \leq y \leq 0.95$, and $0 \leq z \leq 0.95$, with the proviso that both y and z are not 0 at the same time; $\alpha=1$ or 2; $\beta=2$ or 3; $A^{n-}$ is an n-valent anion, with the proviso that n is an integer of 1 or greater; and $m \geq 0$. $M1^{\alpha+}$ is a cation of at least one substituent element selected from the group consisting of monovalent elements, transition metal elements, and other elements with an ionic radius greater than that of $Mg^{2+}$. $M2^{\beta+}$ is a cation of at least one element selected from the group consisting of divalent elements, transition metal elements, and other elements with an ionic radius greater than that of $Al^{3+}$. Conductivity of Mg—Al LDH can be thus improved by partly (not completely) replacing $Mg^{2+}$ at Mg sites with cations of a predetermined element and/or partly (not completely) replacing $Al^{3+}$ at Al sites with cations of a predetermined element.

As described above, the LDH of the invention has the $Mg^{2+}$ at Mg sites and/or $Al^{3+}$ at Al sites partly, not completely, replaced with cations of a predetermined element. Although not entirely clear, a possible mechanism of the improvement in conductivity of Mg—Al LDH due to the partial replacement is as follows. $M1^{\alpha+}$ and $M2^{\beta+}$ may be respectively monovalent ($M1^{\alpha+}$) and divalent ($M2^{\beta+}$) elements, i.e. elements with lower valence than $Mg^{2+}$ and $Al^{3+}$, respectively, to be replaced. In such a case, the replacement of constituent elements of a hydroxide layer of LDH by elements with lower valence may promote attraction of protons, resulting in improvement in conductivity. $M1^{\alpha+}$ and $M2^{\beta+}$ each may also be transition metal elements. In such a case, the transition metals each may change their valences to promote attraction of protons, resulting in improvements in conductivity. $M1^{\alpha+}$ and $M2^{\beta+}$ may also be elements with an ionic radius greater than $Mg^{2+}$ and $Al^{3+}$, respectively, to be replaced. In such a case, the replacement by elements with a greater ionic radius may provide a wider gap between layers of LDH to promote interlayer water diffusion, resulting in improvements in conductivity.

$M1^{\alpha+}$ (wherein $\alpha=1$ or 2) to partly substitute for $Mg^{2+}$ at Mg sites is a cation of at least one substituent element selected from the group consisting of monovalent elements, transition metal elements, and other elements with an ionic radius greater than that of $Mg^{2+}$.

Examples of a cation of a monovalent element include $Li^+$, $Na^+$, and $K^+$, and any combination thereof. Examples of a cation of a transition metal element include $Co^{2+}$, $Ni^{2+}$, $Mn^{2+}$, $Cu^{2+}$, and $Fe^{2+}$, and any combination thereof. Examples of a cation of other element with an ionic radius greater than that of $Mg^{2+}$ include $Zn^{2+}$, $Ca^{2+}$, $Sr^{2+}$, and $Ba^{2+}$, and any combination thereof. $M1^{\alpha+}$ preferably includes $Li^+$, $Co^{2+}$, $Ni^{2+}$, $Mn^{2+}$, $Cu^{2+}$, or $Zn^{2+}$, or any combination thereof, from the viewpoints of lower raw material costs and ease of synthesis of LDH, in addition to higher conductivity. More preferably, $M1^{\alpha+}$ includes $Li^+$, $Ni^{2+}$, $Mn^{2+}$, $Cu^{2+}$, or $Zn^{2+}$, or any combination thereof, particularly preferably $Ni^{2+}$ or $Mn^{2+}$ or combination thereof, most preferably $Ni^{2+}$, from the viewpoint of higher conductivity. In the general formula, the coefficient y representing a replacement ratio of the $Mg^{2+}$ at Mg sites by $M1^{\alpha+}$ is 0 to 0.95. If the $Mg^{2+}$ at an Mg site is replaced with a cation of a monovalent element, the coefficient y representing the replacement ratio is preferably 0 to 0.50, more preferably 0 to 0.10, from the viewpoint of improved properties. If the $Mg^{2+}$ at an Mg site is replaced with a cation of a transition metal element, the resulting LDH may cause self-discharge when used as a separator. Thus it is desirable that the replacement ratio is controlled to an extent that can improve the properties of LDH without providing electron conductivity. From this viewpoint, the coefficient y representing the replacement ratio is preferably 0 to 0.30, more preferably 0.05 to 0.15. If the $Mg^{2+}$ at an Mg site is replaced with a cation of any other element having an ionic radius greater than that of $Mg^{2+}$, the coefficient y representing the replacement ratio is preferably 0.50 to 0.95, more preferably 0.80 to 0.95, from the viewpoint of improved properties. According to the LDH of the invention, at least either of the $Mg^{2+}$ and $Al^{3+}$ at Mg and Al sites, respectively, is partly replaced, which indicates that both y and z are not 0 at the same time.

$M2^{\beta+}$ (wherein $\beta=2$ or 3) to partly substitute for an $Al^{3+}$ at Al sites is a cation of at least one element selected from the group consisting of divalent elements, transition metal elements, and other elements with an ionic radius greater than that of $Al^{3+}$. Examples of the cation of a divalent element include $Ca^{2+}$, $Sr^{2+}$, and $Ba^{2+}$, and any combination thereof. Examples of the cation of a transition metal element include $Fe^{3+}$, $Cr^{3+}$, $Mn^{3+}$, $Co^{3+}$, $Ni^{3+}$, and $Cu^{3+}$, and any combination thereof. Examples of the cation of other element with an ionic radius greater than that of $Al^{3+}$ include $Ga^{3+}$ and $In^{3+}$, and combination thereof. $M2^{\beta+}$ preferably includes $Fe^{3+}$, from the viewpoints of lower raw material costs and ease of synthesis of LDH, in addition to higher conductivity. In the general formula, the coefficient z representing a replacement ratio of the $Al^{3+}$ at an Al site by $M2^{\beta+}$ is 0 to 0.95, preferably 0 to 0.30, more preferably 0.05 to 0.15. According to the LDH of the invention, at least either of the $Mg^{2+}$ and $Al^{3+}$ at Mg and Al sites, respectively, is partly replaced, which indicates that both y and z are not 0 at the same time, as described above.

In the general formula, i.e. $[Mg^{2+}_{(1-y)}M1^{\alpha+}_{y}]_{1-x}[Al^{3+}_{(1-z)}M2^{\beta+}_{z}]_{x}(OH)_2 A^{n-}_{x/n} \cdot mH_2O$, $A^{n-}$ is an n-valent anion, and n is an integer of 1 or greater, preferably 1 or 2. $A^{n-}$ may be any anion, and preferred examples thereof include $OH^-$, $CO_3^{2-}$, $Cl^-$, and $NO_3^-$, and any combination thereof. More preferably, $A^{n-}$ includes $OH^-$ and/or $CO_3^{2-}$. The coefficient x is 0.1 to 0.4, preferably 0.2 to 0.35, and m is a real number or integer of 0 or greater, typically greater than 0.

Layered Double Hydroxide Dense Membrane

According to a preferred embodiment, the invention provides a layered double hydroxide dense membrane (hereinafter, referred to as "LDH dense membrane") that is a water-impermeable dense membrane containing the aforementioned layered double hydroxide (LDH). The LDH dense membrane contains LDH, and is preferably composed mainly of such LDH. The LDH dense membrane is dense enough to have water impermeability (preferably both water impermeability and gas impermeability). As a result, the LDH dense membrane of the present invention has hydroxide ion conductivity and water impermeability and can serve as a separator for batteries. From the viewpoint of use of LDHs as a solid electrolyte separator for batteries, a dense LDH bulk has been inadequate due to its high resistance. According to the present invention, the LDH dense membrane can be thinned to reduce resistance. In other words, the LDH dense membrane of the invention may be a very useful material for a solid electrolyte separator which can be applied to various batteries such as metal-air batteries (e.g. zinc-air batteries) and various other zinc secondary batteries (e.g. nickel-zinc batteries).

Figure 2:
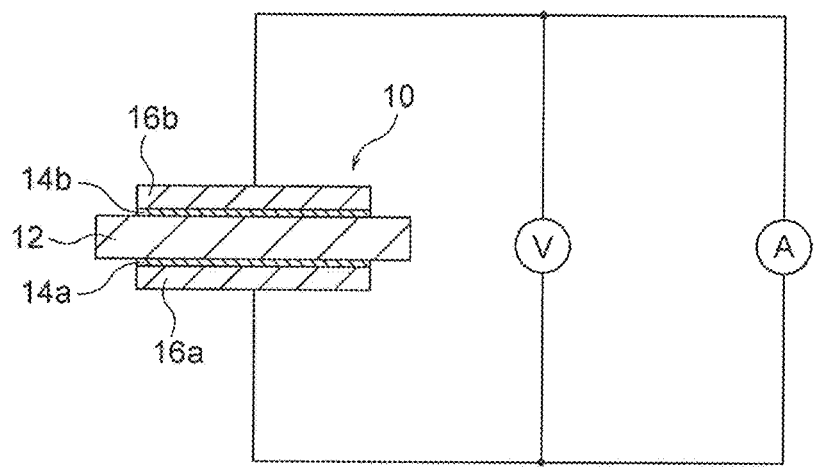
FIG. 2 is a schematic illustration of a system for measuring conductivity used in Examples A1 to A12.

The layered double hydroxide contained in the LDH dense membrane is composed of an agglomeration of platy particles (i.e., platy LDH particles). Preferably, these platy particles are oriented such that the tabular faces of the platy particles are perpendicular to or oblique to the surface of the LDH dense membrane or the porous substrate (i.e., the substrate surface). As illustrated in FIG. 2, the LDH crystal is in the form of a platy particle with a layered structure. The perpendicular or oblique orientation described above is significantly beneficial for the LDH dense membrane, because an oriented LDH dense membrane exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH dense membrane. In fact, the present inventors have revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the perpendicular or oblique orientation in the LDH dense membrane fully or significantly leads to the anisotropic hydroxide ion conductivity of the oriented LDH to the thickness direction of the layer (i.e., the direction perpendicular to the surface of the LDH dense membrane or the surface of the porous substrate), whereby the conductivity in the thickness direction can be maximally or significantly increased. In addition, the LDH dense membrane has a layered structure and thus exhibits lower resistance than an LDH bulk block. The LDH dense membrane having such an orientation readily conducts hydroxide ions in the thickness direction of the layer. Because of its high density, the LDH dense membrane is very suitable for use in a functional membrane that is desired to have high conductivity across the thickness of the layer and high density, such as a separator for a battery (e.g., a hydroxide-ion-conductive separator for a zinc-air battery).

In a particularly preferred embodiment, the LDH dense membrane is composed of the platy LDH particles highly oriented in the perpendicular direction. If the platy LDH particles are highly orientated in the perpendicular direction, the X-ray diffractometry of the surface of the LDH dense membrane shows substantially no peak of (003) plane or a peak of (003) plane smaller than that of (012) plane (note: this shall not apply to the case where the porous substrate shows a diffraction peak at the same angle as the peak of (012) plane of the platy LDH particles, because the peak of (012) plane of the platy LDH particles cannot be specified). This characteristic peak profile indicates that the platy LDH particles of the LDH dense membrane are oriented perpendicular to (i.e., perpendicular to or oblique and nearly perpendicular to, and preferably perpendicular to) the LDH dense membrane. The peak of (003) plane is strongest among peaks observed by X-ray diffractometry of non-oriented LDH powder. In contrast, the oriented LDH dense membrane shows substantially no peak of (003) plane or the peak of (003) plane smaller than the peak of (012) plane because platy LDH particles are oriented perpendicular to the LDH dense membrane. The reason for this is as follows: The c planes (00l) including the (003) plane (where l is 3 or 6) are parallel to the layers of platy LDH particles. If the platy LDH particles are oriented perpendicular to the LDH dense membrane, the layers of platy LDH particles are also perpendicular to the LDH dense membrane and thus the X-ray diffractometry of the surface of the LDH dense membrane shows no peak or very small peak of (00l) plane (where l is 3 or 6). The peak of (003) plane, if present, tends to be stronger than the peak of (006) plane, and the use of the peak of (003) plane facilitates determination of the perpendicular orientation as compared with the use of the peak of (006) plane. Thus, the oriented LDH dense membrane preferably shows substantially no peak of (003) plane or shows the peak of (003) plane smaller than the peak of (012) plane, which indicates that the highly perpendicular orientation is achieved.

The LDH dense membrane has a thickness of preferably 100 μm or less, more preferably 75 μm or less, still more preferably 50 μm or less, particularly preferably 25 μm or less, most preferably 5 μm or less. Such a small thickness leads to a reduction in resistance of the dense membrane. The dense membrane having the above thickness exhibits a low resistance suitable for use in, for example, a battery. The lower limit of the thickness of the dense membrane, which may vary with the intended use of the membrane, may be any value. In order to ensure the hardness desirable for use in a functional membrane, such as a separator, the thickness is preferably 1 μm or more, more preferably 2 μm or more.

At least one surface of the LDH dense membrane may have a non-flat surface structure. This non-flat surface structure has many cavities and/or protrusions and thus achieves a very large surface area. Thus, the contact of the dense membrane with an electrolytic solution for use of the dense membrane as a separator in the electrolytic solution leads to an increase in interfacial area between the dense membrane and the electrolytic solution, resulting in reduced interfacial resistance. The dense layered structure having such a surface structure and exhibiting hydroxide ion conductivity and water impermeability can function as an LDH separator exhibiting a low interfacial resistance with an electrolytic solution. The non-flat surface structure preferably contains acicular particles protruding from the dense membrane in a direction away from the dense membrane (typically perpendicular to the dense membrane). The presence of the acicular particles can significantly increase the surface area of the dense membrane, resulting in an effective and significant reduction in interfacial resistance between the dense membrane and an electrolytic solution. The cross-sectional size of each acicular particle is preferably 0.01 to 0.5 μm, more preferably 0.01 to 0.3 μm. The height of each acicular particle is preferably 0.5 to 3.0 μm, more preferably 1 to 3 μm. As used herein, "the height of each acicular particle" refers to the height of a protruding portion of the particle as measured from the surface of the dense membrane. The non-flat surface structure also preferably contains porous coarse particles having high porosity. The presence of the porous coarse particles can significantly increase the surface area of the dense membrane, resulting in a more effective reduction in interfacial resistance between the dense membrane and an electrolytic solution. In a particularly preferred embodiment, the porous coarse particles are agglomerates composed of entangled acicular or platy particles and having numerous pores. These agglomerates, which may be called spherical moss-like particles, exhibit the effect of increasing the surface area of the dense membrane. The porous coarse particles each have a diameter of preferably 0.5 to 30 μm, more preferably 0.5 to 20 μm, as measured in a direction parallel to the dense membrane. The height of each porous coarse particle is preferably 0.5 to 30 μm, more preferably 1 to 30 μm. As used herein, "the height of each porous coarse particle" refers to the height of a protruding portion of the particle as measured from the surface of the dense membrane. The non-flat surface structure also preferably contains both acicular particles and porous coarse particles.

Composite Material

The LDH dense membrane is preferably disposed on at least one surface of a porous substrate. In a preferred embodiment, the present invention provides a composite material comprising a porous substrate and the aforementioned LDH dense membrane disposed on at least one surface of the porous substrate. As used herein, "the surface of a porous substrate" generally refers to the outermost surface of the porous substrate, which has a platy shape under macroscopic observation of the substrate, and may also refer to the surfaces of pores present near the outermost surface of the platy porous substrate under microscopic observation of the substrate.

The porous substrate is preferably one on which the LDH dense membrane can be formed. The porous substrate may be composed of any material and may have any porous structure. In a typical embodiment, the LDH dense membrane is formed on the surface of the porous substrate. Alternatively, the LDH dense membrane may be formed on a non-porous substrate, and then the non-porous substrate may be modified into a porous form by any known processes. The porous substrate preferably has a water-permeable porous structure because such a porous structure enables an electrolytic solution to come into contact with the LDH dense membrane in the case that the porous substrate functions as a separator in a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina, zirconia (e.g., yttria-stabilized zirconia (YSZ)), and any combination thereof. The use of such a porous ceramic material facilitates the formation of a high-density LDH membrane. Preferred examples of the metal material include aluminum and zinc. Preferred examples of the polymer material include polystyrene, polyether sulfone, polypropylene, epoxy resins, polyphenylene sulfide, hydrophilized fluororesins (e.g., poly(tetrafluoroethylene) (PTFE)), and any combination thereof. Each of the preferred materials described above has alkali resistance; i.e., resistance to an electrolytic solution of a battery.

The porous substrate has an average pore size of preferably 0.001 to 1.5 μm, more preferably 0.001 to 1.25 μm, still more preferably 0.001 to 1.0 μm, particularly preferably 0.001 to 0.75 μm, most preferably 0.001 to 0.5 μm. Such a preferred range ensures desired water permeability in the porous substrate and leads to formation of a LDH dense membrane exhibiting water impermeability (preferably both water impermeability and gas impermeability). As used herein, the term "water impermeability" indicates that water in contact with one surface of an analyte (i.e., the LDH dense membrane and/or the porous substrate) does not reach the other surface during the "density evaluation test" performed in Example B5 described below or any other equivalent method or system. In the present invention, the average pore size can be determined by measuring the largest length of each pore in an electron microscopic image of the surface of the porous substrate. The magnification of the electron microscopic image used in this measurement is 20,000 or more. All the measured pore sizes are listed in order of size to calculate the average, from which the subsequent 15 larger sizes and the subsequent 15 smaller sizes, i.e., 30 sizes in total, are selected in one field of view. The selected sizes of two fields of view are then averaged to yield the average pore size. The pore sizes can be measured by, for example, a length-measuring function of an electron microscope or image analysis software (e.g., Photoshop manufactured by Adobe).

The surface of the porous substrate has a porosity of preferably 10 to 60%, more preferably 15 to 55%, still more preferably 20 to 50%. Such a preferred range ensures desired water permeability in the porous substrate and leads to formation of a LDH dense membrane exhibiting water impermeability (preferably both water impermeability and gas impermeability). The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity of the surface of the porous substrate can be measured by a method involving image processing as follows: 1) an electron microscopic image of the surface of the porous substrate is taken at a magnification of 10,000 or more; 2) the grayscale electron microscopic image is read with image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 μm×6 μm area of the surface of the porous substrate by image processing. More preferably, the porosities in three 6 μm×6 μm areas selected at random are averaged for objective evaluation.

Production Method

The LDH dense membrane or LDH-containing composite material of the present invention is preferably produced through a method involving (a) providing a porous substrate, (b) evenly depositing a material for generating a species from which LDH crystal growth starts (i.e., a material for starting crystal growth) on the porous substrate if needed, and (c) hydrothermally treating the porous substrate to form an LDH dense membrane.

(a) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof.

Particularly preferred are alumina, zirconia (e.g., yttria-stabilized zirconia (YSZ)), and any combination thereof. The use of such a porous ceramic material tends to improve the density of a LDH dense membrane. In the case of a ceramic porous substrate, the porous substrate is preferably subjected to, for example, ultrasonic cleaning or cleaning with ion-exchange water.

As described above, the porous substrate is more preferably composed of a ceramic material. The ceramic porous substrate may be any commercially available one or may be prepared by any known process. For example, the ceramic porous substrate may be prepared as follows: Ceramic powder (e.g., zirconia powder, boehmite powder, or titania powder), methyl cellulose, and ion-exchange water are mixed in predetermined proportions; the resultant mixture is subjected to extrusion molding; the molded product is dried at 70 to 200° C. for 10 to 40 hours; and the dried product is fired at 900 to 1,300° C. for one to five hours. The amount of methyl cellulose is preferably 1 to 20 parts by weight relative to 100 parts by weight of the ceramic powder. The amount of ion-exchange water is preferably 10 to 100 parts by weight relative to 100 parts by weight of the ceramic powder.

(b) Deposition of Material for Starting Crystal Growth

If needed, a material for generating a species from which LDH crystal growth starts may be evenly deposited on the porous substrate. The even deposition of such a material for starting crystal growth on the surface of the porous substrate and the subsequent step (c) can form a highly-densified LDH membrane evenly on the surface of the porous substrate. Preferred examples of the species from which LDH crystal growth starts include chemical species generating an anion that can enter between layers of LDH, chemical species generating a cation that can constitute LDH, and LDHs.

(i) Anion-Generating Chemical Species

The LDH crystal growth may start from a chemical species generating an anion that can enter between LDH layers. Examples of the anion include $CO_3^{2-}$, $OH^-$, $SO_3^-$, $SO_3^{2-}$, $SO_4^{2-}$, $NO_3^-$, $Cl^-$, $Br^-$, and any combination thereof. A material for generating such a species may be evenly deposited on the surface of the porous substrate by a process suitable for the material for starting crystal growth. The deposition of such an anion-generating chemical species on the surface of the porous substrate leads to adsorption of a metal cation (e.g., $Mg^{2+}$ or $Al^{3+}$) on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate after the deposition of a polymer on the surface of the porous substrate and subsequent introduction of an anion-generating chemical species into the polymer. In this embodiment, the anion is preferably $SO_3^-$, $SO_3^{2-}$, and/or $SO_4^{2-}$. Such an anion-generating chemical species is preferably introduced into the polymer through sulfonation. The polymer may be an anionizable (in particular, sulfonatable) polymer. Examples of such a polymer include polystyrene, polyether sulfone, polypropylene, epoxy resins, polyphenylene sulfide, and any combination thereof. Aromatic polymers are particularly preferred because they are readily anionized (in particular, sulfonated). Examples of the aromatic polymers include polystyrene, polyether sulfone, epoxy resins, polyphenylene sulfide, and any combination thereof. Most preferred is polystyrene. The deposition of the polymer on the porous substrate preferably involves application of a polymer solution to the surface of the porous substrate (preferably, to particles forming the outermost surface of the generally platy porous substrate). The polymer solution can be readily prepared by, for example, dissolution of a solid polymer (e.g., a polystyrene substrate) in an organic solvent (e.g., xylene). In view of even application of the polymer solution, the solution is preferably applied to the porous substrate such that the solution does not permeate the substrate. Thus, spin coating is preferred for very even deposition or application of the polymer solution. The spin coating may be performed under any conditions; for example, a rotation speed of 1,000 to 10,000 rpm and an operational period of about 60 to 300 seconds (involving dropwise addition and drying). The sulfonation may be performed by immersing the polymer-deposited porous substrate in an acid for sulfonating the polymer, such as sulfuric acid (e.g., concentrated sulfuric acid), fuming sulfuric acid, chlorosulfonic acid, and sulfuric anhydride. Any other sulfonation techniques may also be used. The porous substrate may be immersed in such a sulfonating acid at room temperature or a high temperature (e.g., 50 to 150° C.) for any period of time (e.g., 1 to 14 days).

In another preferred embodiment of the present invention, the material for starting crystal growth may be deposited on the porous substrate by treatment of the surface of the substrate with a surfactant containing an anion-generating chemical species as a hydrophilic moiety. In this embodiment, the anion is preferably $SO_3^-$, $SO_3^{2-}$, and/or $SO_4^{2-}$. Typical examples of such a surfactant include anionic surfactants. Preferred examples of the anionic surfactant include sulfonate anionic surfactants, sulfate anionic surfactants, and any combination thereof. Examples of the sulfonate anionic surfactants include (sodium naphthalenesulfonate)-formalin condensate, disodium polyoxyethylene alkyl sulfosuccinate, poly(sodium styrenesulfonate), sodium dioctyl sulfosuccinate, and polyoxyethylene lauryl ether sulfate triethanolamine. Examples of the sulfate anionic surfactants include sodium polyoxyethylene lauryl ether sulfate. The porous substrate may be treated with a surfactant by any process that can deposit the surfactant on the surface of the porous substrate; for example, application of a surfactant-containing solution to the porous substrate, or immersion of the porous substrate in a surfactant-containing solution. The porous substrate may be immersed in the surfactant-containing solution with agitation of the solution at room temperature or a high temperature (e.g., 40 to 80° C.) for any period of time (e.g., one to seven days).

(ii) Cation-Generating Chemical Species

The LDH crystal growth may start from a chemical species generating a cation that can constitute the layered double hydroxide. Such a cation is preferably $Al^{3+}$, for example. In this case, the material for starting crystal growth is preferably at least one aluminum compound selected from the group consisting of oxides, hydroxides, oxyhydroxides, and hydroxy complexes of aluminum. A material for starting crystal growth may be evenly deposited on the surface of the porous substrate by a process suitable for the material. The deposition of such a cation-generating chemical species on the surface of the porous substrate leads to adsorption of an anion that can enter between layers of LDH on the surface of the porous substrate, resulting in nucleation of LDH. Thus, the subsequent step (c) can evenly form a highly-densified LDH membrane on the surface of the porous substrate.

In a preferred embodiment of the present invention, the material for starting crystal growth may be deposited on the porous substrate by application of a sol containing an aluminum compound to the porous substrate. Preferred examples of the aluminum compound include boehmite (AlOOH), aluminum hydroxide (Al(OH)$_3$), and amorphous alumina. Most preferred is boehmite. Spin coating is preferably used for very even application of the sol containing the aluminum compound. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by hydrothermal treatment of the porous substrate in an aqueous solution containing at least aluminum to form an aluminum compound on the surface of the porous substrate. The aluminum compound to be formed on the surface of the porous substrate is preferably Al(OH)$_3$. The LDH dense membrane on the porous substrate (in particular, a ceramic porous substrate) tends to form crystalline and/or amorphous Al(OH)$_3$ at the initial growth stage. LDH growth may start from the Al(OH)$_3$ serving as a nucleus. Thus, the hydrothermal treatment step (c) after even deposition of Al(OH)$_3$ on the surface of the porous substrate by hydrothermal treatment can evenly form a highly-densified LDH membrane on the surface of the porous substrate. In this embodiment, step (b) and subsequent step (c) may be continuously performed in the same hermetic container, or may be sequentially performed in separate containers.

If steps (b) and (c) are continuously performed in the same hermetic container, an aqueous stock solution used in step (c) described below (i.e., an aqueous solution containing an element constituting LDH) may be used in step (b). In such a case, the hydrothermal treatment in step (b) is performed in a hermetic container (preferably an autoclave) in an acidic or neutral pH range (preferably at a pH of 5.5 to 7.0) at a relatively low temperature of 50 to 70° C., to promote nucleation of Al(OH)$_3$, instead of LDH. After the nucleation of Al(OH)$_3$, the aqueous stock solution is maintained at the nucleation temperature or heated from the temperature, to promote hydrolysis of urea, resulting in an increase in pH of the aqueous stock solution. Thus, step (b) is smoothly followed by step (c) in a pH range suitable for LDH growth (preferably a pH of more than 7.0).

If steps (b) and (c) are sequentially performed in separate containers, it is preferred that different aqueous stock solutions be used for steps (b) and (c). For example, step (b) preferably involves the use of an aqueous stock solution primarily containing an Al source (preferably, not containing a metal element other than Al) for nucleation of Al(OH)$_3$. In this case, the hydrothermal treatment in step (b) may be performed at 50 to 120° C. in a hermetic container (preferably an autoclave) different from that used in step (c) described below. Preferred examples of the aqueous stock solution primarily containing an Al source include an aqueous solution containing aluminum nitrate and urea but not containing a magnesium compound (e.g., magnesium nitrate). The use of the Mg-free aqueous stock solution can avoid precipitation of LDH, resulting in promotion of nucleation of Al(OH)$_3$.

In yet another preferred embodiment of the present invention, the material for starting crystal growth may be deposited on the porous substrate by vapor deposition of aluminum on the surface of the porous substrate and then conversion of the aluminum into an aluminum compound through hydrothermal treatment in an aqueous solution. The aluminum compound is preferably Al(OH)$_3$. In particular, the conversion of aluminum into Al(OH)$_3$ promotes LDH growth from the Al(OH)$_3$ serving as a nucleus. Thus, step (c) of hydrothermal treatment after even formation of Al(OH)$_3$ on the surface of the porous substrate by hydrothermal treatment can evenly form a highly-densified LDH membrane on the surface of the porous substrate. The vapor deposition of aluminum may involve physical or chemical vapor deposition, and preferably involves physical vapor deposition, such as vacuum deposition. The hydrothermal treatment for conversion of aluminum into Al(OH)$_3$ may use any aqueous solution containing a component that can react with the deposited Al to form Al(OH)$_3$.

(iii) LDH as Material for Starting Crystal Growth

The crystal growth may start from LDH. In this case, LDH growth may start form LDH serving as a nucleus. The even deposition of the LDH nucleus on the surface of the porous substrate and subsequent step (c) can form a highly-densified LDH membrane evenly on the surface of the porous substrate.

In a preferred embodiment of the present invention, the material for starting crystal growth may be deposited on the porous substrate by application of an LDH-containing sol to the surface of the porous substrate. The LDH-containing sol may be any sol and may be prepared by dispersion of LDH in a solvent, such as water. In this embodiment, spin coating is preferably used for very even application of the LDH-containing sol. The spin coating may be performed under any conditions; for example, a rotation speed of 1,000 to 10,000 rpm and an operational period of about 60 to 300 seconds (involving dropwise addition and drying).

In another preferred embodiment of the present invention, the material for starting crystal growth may be deposited on the porous substrate by vapor deposition of aluminum on the surface of the porous substrate and then conversion of the (vapor-deposited) aluminum into LDH through hydrothermal treatment in an aqueous solution containing an element constituting LDH other than aluminum. The vapor deposition of aluminum may involve physical or chemical vapor deposition, and preferably involves physical vapor deposition, such as vacuum deposition. The hydrothermal treatment for conversion of aluminum into LDH may use an aqueous stock solution containing a component other than the vapor-deposited Al. Preferred examples of the aqueous stock solution include an aqueous stock solution primarily containing an Mg source. More preferred is an aqueous solution containing magnesium nitrate and urea but not containing an aluminum compound (e.g., aluminum nitrate). The use of the Mg source-containing aqueous solution results in nucleation of LDH together with the vapor-deposited Al. In nucleatin of LDH, the aforementioned ions of the substituent element(s) M1$^{\alpha+}$ (wherein α=1 or 2) and/or M2$^{\beta+}$ (wherein 3=2 or 3) may be added.

(c) Hydrothermal Treatment

The porous substrate (on which the material for starting crystal growth may be deposited if needed) is hydrothermally treated in an aqueous stock solution containing the elements of LDH, to form the LDH dense membrane on the surface of the porous substrate. Preferably, the aqueous stock solution contains magnesium ions (Mg$^{2+}$) and aluminum ions (Al$^{3+}$) and the aforementioned ions of the substituent element(s) M1$^{\alpha+}$ (wherein α=1 or 2) and/or M2$^{\beta+}$ (wherein β=2 or 3) in a specific total concentration and further contains urea. Urea is hydrolyzed into ammonia and raises the pH of the aqueous stock solution (e.g., a pH of more than 7.0, preferably a pH of more than 7.0 and 8.5 or less), and metal ions co-existing in the aqueous stock solution form hydroxides, to produce LDH. The hydrolysis of urea, which also generates carbon dioxide, can form LDH having carbonate ions as anions. The aqueous stock solution contains magnesium ions and aluminum ions (Mg$^{2+}$+M1$^{\alpha+}$+

$Al^{3+}+M2^{\beta+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, high-density LDH membrane. At a low total concentration of magnesium ions and aluminum ions, the crystal growth dominates over the nucleation, resulting in a decrease in number of LDH particles and an increase in size of the LDH particles. At a high total concentration, the nucleation dominates over the crystal growth, resulting in an increase in number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3^-$) in the aqueous stock solution is preferably 2 to 6, more preferably 4 to 5.

The porous substrate may be immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are perpendicular to or oblique to the surface of the porous substrate).

The porous substrate is hydrothermally treated in the aqueous stock solution to form the LDH dense membrane on the surface of the porous substrate. The hydrothermal treatment is performed in a hermetic container (preferably an autoclave) at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH dense membrane.

After the hydrothermal treatment, the porous substrate is removed from the hermetic container, and then preferably cleaned with ion-exchange water.

The LDH dense membrane produced as described above is composed of very densely packed platy LDH particles that are oriented in the perpendicular direction, which is beneficial for the conductivity. The LDH dense membrane typically exhibits water impermeability (preferably both water impermeability and gas impermeability) because of its high density. The LDH of the LDH dense membrane is typically composed of an agglomeration of platy particles, and these platy particles are oriented such that the tabular faces of the platy particles are perpendicular to or oblique to the surface of the porous substrate. Thus, the use of the LDH dense membrane having density enough to achieve sufficient gas-barrier properties in batteries (e.g., zinc-air batteries) will lead to an improvement in electricity generating capacity.

Furthermore, the LDH dense membrane is expected to be used in novel applications, such as a separator that can prevent growth of dendritic zinc and permeation of carbon dioxide, which have been large technical barriers against forming a zinc-air secondary battery containing an electrolytic solution that has not been achieved. The LDH dense membrane is also expected to be used in a nickel-zinc battery that has suffered from growth of dendritic zinc which is a large obstacle to practical use of this battery.

The above-described method may form LDH dense membranes on the two surfaces of the porous substrate. Thus, in order to modify the LDH dense membrane into a form suitable for use as a separator, the LDH dense membrane on one surface of the porous substrate is preferably removed through mechanical polishing after the formation of the LDH dense membranes. Alternatively, it is desirable to take a measure to prevent formation of the LDH dense membrane on one surface of the porous substrate during the formation of the membrane.

EXAMPLES

The present invention will now be described in more detail by way of Examples.

Example A1 (Comparative)

(1) Preparation of LDH Powder

In ion-exchange water, 0.06 mol of $Mg(NO_3)_2.6H_2O$ and 0.02 mol of $Al(NO_3)_2.9H_2O$ were dissolved to prepare 400 ml of an aqueous stock solution. The aqueous stock solution was dropwisely added to 100 ml of 0.1 M aqueous $Na_2CO_3$ under stirring at 60° C. for about 40 minutes. During this process, 2 M aqueous NaOH was dropwisely added to the aqueous stock solution, if necessary, such that the aqueous stock solution always had pH of 10. This series of procedures are based on so-called coprecipitation. The resultant reaction solution was heated at 60° C. for five hours to generate hydrotalcite particles, and then was subjected to hydrothermal treatment at 100° C. for 12 hours to allow the hydrotalcite particles to grow. The resultant hydrotalcite particles were separated by suction filtration and washed with water and then with ethanol to remove nitrates and sodium. The washed particles were dried at 80° C., and then were ground in a mortar to prepare sample powder.

(2) Evaluations (2a) Identification of Crystalline Phase

The crystalline phase of the sample powder was analyzed with an X-ray diffractometer (D8 ADVANCE, manufactured by Bulker AXS) at a voltage of 40 kV, a current of 40 mA, and a measuring range of 5° to 70°. The profile was compared with the diffraction peaks of hydrotalcite described in JCPDS card No. 35-0965 to confirm the presence of the single hydrotalcite phase. As a result, a single hydrotalcite phase was identified.

(2b) Confirmation of Dopant Solid Solution (2b-1) Measurement of Lattice Constants The lattice constants of the sample powder were measured by X-ray diffractometry with the same system as in (2a) by Cu Kα radiation, at a tube voltage of 40 kV, at a tube current of 40 mA, in a measurement mode by step scanning at a step width of 0.05° and counting time of 1 s/step in a scanning range of 8° to 140° (2θ). The measurement data was fitted with TOPAS, a structural analysis software of Bulker. The lengths of a- and c-axes were 3.062 Å and 23.43 Å, respectively, both of which were approximate to typical lattice constants of hydrotalcite (having lengths of a- and c-axes of 3.054 Å and 23.4 Å, respectively, according to ICDD35-0965). The lattice constants measured in Example A1 were used for comparison (as a reference) with other Examples below.

(2b-2) EDS Quantitative Analysis

In order to measure the amount of dopant present in the particles, the sample powder was subjected to SEM-EDS compositional analysis as follows. The sample powder was scattered to adhere on a carbon tape. The SEM images were taken with a scanning electron microscope (JSM-5410, manufactured by JEOL Ltd.). In a field of view at a magnification of 500, aggregated spots of LDH particles were analyzed by EDS, and the average value was used for determination of the composition of the particles. The EDS analysis was performed at an acceleration voltage of 20 kV, at a working distance of 10 mm, and for a collecting time of 60 sec/spot.

(2c) Measurement of Conductivity

The powder was molded by cold isostatic pressing (CIP) at a pressure of 3 t/cm$^2$ to prepare a green compact sample with a diameter of 13 mm and a thickness of 1 mm. The green compact sample was measured for conductivity by two-terminal method as follows. As shown in FIG. 2, the two sides (pressed surfaces) of the green compact sample 12 were spattered with gold to form electrodes 14a and 14b, and then current collectors 16a and 16b, composed of Ni foam were disposed on the electrodes 14a and 14b, respectively, to prepare a sample 10 for conductivity measurement. The conductivity was measured with Solartron Analytical's systems 1287 and 1260 and determined by alternating current impedance analysis. The measurement was performed in a thermostat-humidistat bath at 30° C., at a relative humidity of 90%, with AC voltage amplitude of 100 mV, and in a measurement frequency range of 0.1 Hz to 1 MHz. The conductivity determined in Example A1 was used for comparison (as a reference) with other Examples below.

Example A2

Sample powder was prepared and evaluated as in Example A1, except that 10 mol % in 0.02 mol (i.e. 0.002 mol) of Al(NO$_3$)$_2$.9H$_2$O was replaced with Fe(NO$_3$)$_3$.9H$_2$O in preparation of the aqueous stock solution.

Example A3

Sample powder was prepared and evaluated as in Example A1, except that 10 mol % in 0.06 mol (i.e. 0.006 mol) of Mg(NO$_3$)$_2$.6H$_2$O was replaced with Co(NO$_3$)$_2$.6H$_2$O in preparation of the aqueous stock solution.

Example A4

Sample powder was prepared and evaluated as in Example A1, except that 10 mol % in 0.06 mol (i.e. 0.006 mol) of Mg(NO$_3$)$_2$.6H$_2$O was replaced with Ni(NO$_3$)$_2$.6H$_2$O in preparation of the aqueous stock solution.

Example A5

Sample powder was prepared and evaluated as in Example A1, except that 95 mol % in 0.06 mol (i.e. 0.057 mol) of Mg(NO$_3$)$_2$.6H$_2$O was replaced with Ni(NO$_3$)$_2$.6H$_2$O in preparation of the aqueous stock solution.

Example A6

Sample powder was prepared and evaluated as in Example A1, except that 95 mol % in 0.06 mol (i.e. 0.057 mol) of Mg(NO$_3$)$_2$.6H$_2$O was replaced with Ni(NO$_3$)$_2$.6H$_2$O, and 95 mol % in 0.02 mol (i.e. 0.019 mol) of Al(NO$_3$)$_2$.9H$_2$O was replaced with Fe(NO$_3$)$_3$.9H$_2$O in preparation of the aqueous stock solution.

Example A7

In ion-exchange water, 0.054 mol of Mg(NO$_3$)$_2$.6H$_2$O and 0.02 mol of Al(NO$_3$)$_2$.9H$_2$O were dissolved to prepare 400 ml of an aqueous stock solution. The aqueous stock solution was dropwisely added to 100 ml of 0.1 M aqueous Na$_2$CO$_3$ for about 40 minutes. During the process, 2 M aqueous LiOH was dropwisely added to the aqueous stock solution, if necessary, such that the aqueous stock solution always had pH of 13. The resultant reaction solution was heated at 60° C. for five hours to generate hydrotalcite particles, and then was subjected to hydrothermal treatment at 70° C. for 12 hours to allow the hydrotalcite particles to grow. Subsequent procedures for preparation and evaluation of sample powder were as described in Example A1. In this Example, addition of aqueous LiOH results in addition of Li in an excessive amount relative to the intended amount of replacement (i.e. amount of Li charged). Since LiOH does not precipitate even in an alkalized solution and thus does not work in preparation of a compound by coprecipitation, Mg is charged in an amount reduced by 10 mol % and LiOH is charged with a large excess, such that the LiOH is taken in the crystalline structure of hydrotalcite. Excessive LiOH, which has not been taken in the crystalline structure of hydrotalcite is removed during cleaning of the particles, did not cause any issue.

Example A8 (Comparative)

In ion-exchange water, 0.45 mol of LiOH and 0.024 mol of Na$_2$CO$_3$ were dissolved to prepare 300 ml of an aqueous solution A. In separate ion-exchange water, 0.05 mol of AlCl$_3$.9H$_2$O was dissolved to prepare 125 ml of an aqueous solution B. The aqueous solution B was dropwisely added to the aqueous solution A under vigorous stirring with a stirrer for 20 minutes. The resultant mixed aqueous solution was stirred overnight at room temperature to generate hydrotalcite particles, and then was subjected to hydrothermal treatment at 100° C. for 12 hours to allow the hydrotalcite particles to grow. Subsequent procedures for preparation and evaluation of sample powder were as described in Example A1. In this Example, Li is added in an excessive amount relative to the intended amount of replacement (i.e. amount of Li charged) for the same reason as in Example A7. The crystalline phase of the sample powder was identified by comparison with the diffraction peaks of [Al$_2$Li(OH)$_6$]$_2$CO$_3$.xH$_2$O(Al$^{3+}_{2/3}$Li$^+_{1/3}$(OH)$_2$CO$_3^{2-}_{1/6}$.xH$_2$O) described in JCPDS card No. 42-0729 to confirm the presence of the single phase was observed.

Example A9

Sample powder was prepared and evaluated as in Example A1, except that 10 mol % in 0.06 mol (i.e. 0.006 mol) of Mg(NO$_3$)$_2$.6H$_2$O was replaced with Mn(NO$_3$)$_2$.6H$_2$O in preparation of the aqueous stock solution, the pH value was maintained at 9 during coprecipitation, and no hydrothermal treatment was performed.

Example A10

Sample powder was prepared and evaluated as in Example A1, except that 10 mol % in 0.06 mol (i.e. 0.006 mol) of $Mg(NO_3)_2 \cdot 6H_2O$ was replaced with $Cu(NO_3)_2 \cdot 3H_2O$ in preparation of the aqueous stock solution.

Example A11

Sample powder was prepared and evaluated as in Example A1, except that 10 mol % in 0.06 mol (i.e. 0.006 mol) of $Mg(NO_3)_2 \cdot 6H_2O$ was replaced with $Zn(NO_3)_2 \cdot 6H_2O$ in preparation of the aqueous stock solution.

Example A12

Sample powder was prepared and evaluated as in Example A1, except that 95 mol % in 0.06 mol (i.e. 0.057 mol) of $Mg(NO_3)_2 \cdot 6H_2O$ was replaced with $Zn(NO_3)_2 \cdot 6H_2O$ in preparation of the aqueous stock solution, coprecipitation was performed at 80° C. while the pH value was maintained at 9, the solution after coprecipitation was adjusted to have a pH of 10 and heated at 80° C. for 15 minutes to generate hydrotalcite particles, and no hydrothermal treatment was performed.

Results

Table 1 below shows results of evaluations of the sample powders prepared in Examples A1 to A12. The evaluation of variation in lattice constants in Table 1 indicates whether or not variation was observed in the lattice constants determined in Examples A2 to A12 when compared to the reference lattice constants determined in Example A1. The evaluation of conductivity indicates the measurements of conductivity in Examples A2 to A12 as relative values (i.e. ratio of each conductivity to that of Example A1) to the reference conductivity measurement in Example A1 (i.e. 1.0).

[Table 1]

and/or Al sites, respectively, in the basic composition of LDH were partly replaced exhibited improved conductivity.

Examples B1 to B5 (Reference)

The following Examples are not examples of preparation of partly substituted LDH according to the invention, but are reference examples for demonstrating formation of LDH dense membrane on various porous substrates. An LDH dense membrane according to the invention can be formed as in the following Examples by partly replacing a component in the LDH composition with a predetermined element.

Example B1 (Reference)

(1) Preparation of Porous Substrate
<Samples B1 to B3>

Figure 3:
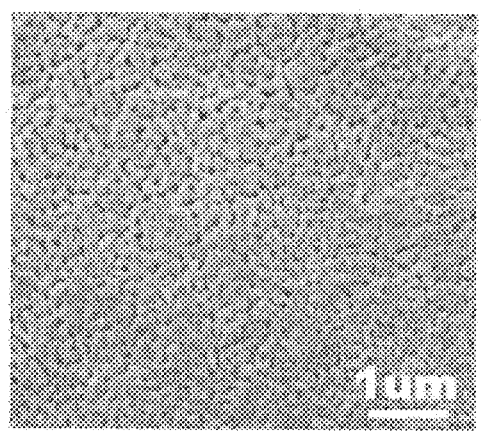
FIG. 3 is an SEM image of a surface of a porous alumina substrate (Sample B2) produced in Example B1.

Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a size of 2.5 cm×10 cm×0.5 cm in thickness. The resultant green body was dried at 80° C. for 12 hours and then fired at a temperature shown in Table 2 for three hours, to pre ST-7 an alumina porous substrate. Thereafter, the alumina porous substrate was shape 001 a size of 2 cm×2 cm×0.3 cm. FIG. 3 is an SEM image showing the surface of the 3US s substrate of Sample B2.

<Samples B4 and B5>

Zirconia (TZ-3Y5 (for Sample B4) or TZ-8YS (for Sample B5), manufactured by TOSOH Corporation), methyl cellulose, and ion-exchange water were weighed in proportions by mass of 10:1:5, and then were kneaded together. The kneaded product was subjected to extrusion molding with a hand press into a size of 2.5 cm×10 cm×0.5 cm in

TABLE 1

| Example | Substituent element (for Al/Mg site) | Intended amount of replacement (charged amount) [at %] | Intended composition (calculated based on the charged amounts) | Crystalline phase | Variation in lattice constants | Dopant solid solution Observed amount of replacement determined by EDS quantitative analysis [at %] | Conductivity (Relative value) |
|---|---|---|---|---|---|---|---|
| A1* | none | — | $Mg^{2+}_{0.75}Al^{3+}_{0.25}(OH)_2CO_3^{2-}{}_{0.125} \cdot 0.5H_2O$ | single | — | — | 1.0 |
| A2 | $Fe^{3+}$ (Al) | 10 | $Mg^{2+}_{0.75}[Al^{3+}_{0.90}Fe^{3+}_{0.10}]_{0.25}(OH)_2CO_3^{2-}{}_{0.125} \cdot 0.5H_2O$ | single | observed | 6.5 | 1.1 |
| A3 | $Co^{2+}$ (Mg) | 10 | $[Mg^{2+}_{0.90}Co^{2+}_{0.10}]_{0.75}Al^{3+}_{0.25}(OH)_2CO_3^{2-}{}_{0.125} \cdot 0.5H_2O$ | single | observed | 8.0 | 1.2 |
| A4 | $Ni^{2+}$ (Mg) | 10 | $[Mg^{2+}_{0.90}Ni^{2+}_{0.10}]_{0.75}Al^{3+}_{0.25}(OH)_2CO_3^{2-}{}_{0.125} \cdot 0.5H_2O$ | single | not observed | 7.8 | 4.4 |
| A5 | $Ni^{2+}$ (Mg) | 95 | $[Mg^{2+}_{0.05}Ni^{2+}_{0.95}]_{0.75}Al^{3+}_{0.25}(OH)_2CO_3^{2-}{}_{0.125} \cdot 0.5H_2O$ | single | observed | 94 | 23 |
| A6 | $Ni^{2+}$ (Mg) $Fe^{3+}$ (Al) | 95 95 | $[Mg^{2+}_{0.05}Ni^{2+}_{0.95}]_{0.75}[Al^{3+}_{0.05}Fe^{3+}_{0.95}]_{0.25}(OH)_2CO_3^{2-}{}_{0.125} \cdot 0.5H_2O$ | single | observed | 96 94 | 13 |
| A7 | $Li^+$ (Mg) | 10 | $[Mg^{2+}_{0.90}Li^+_{0.10}]_{0.75}Al^{3+}_{0.25}(OH)_2CO_3^{2-}{}_{0.125} \cdot 0.5H_2O$ | single | not observed | 0.3 | 7.5 |
| A8* | $Li^+$ (Mg) | 100 | $Al^{3+}_{2/3}Li^+_{1/3}(OH)_2CO_3^{2-}{}_{1/6} \cdot xH_2O$ | single | — | — | 0.5 |
| A9 | $Mn^{2+}$ (Mg) | 10 | $[Mg^{2+}_{0.90}Mn^{2+}_{0.10}]_{0.75}Al^{3+}_{0.25}(OH)_2CO_3^{2-}{}_{0.125} \cdot 0.5H_2O$ | single | observed | 11 | 15 |
| A10 | $Cu^{2+}$ (Mg) | 10 | $[Mg^{2+}_{0.90}Cu^{2+}_{0.10}]_{0.75}Al^{3+}_{0.25}(OH)_2CO_3^{2-}{}_{0.125} \cdot 0.5H_2O$ | single | not observed | 12 | 6.8 |
| A11 | $Zn^{2+}$ (Mg) | 10 | $[Mg^{2+}_{0.90}Zn^{2+}_{0.10}]_{0.75}Al^{3+}_{0.25}(OH)_2CO_3^{2-}{}_{0.125} \cdot 0.5H_2O$ | single | not observed | 8.8 | 1.2 |
| A12 | $Zn^{2+}$ (Mg) | 95 | $[Mg^{2+}_{0.05}Zn^{2+}_{0.95}]_{0.75}Al^{3+}_{0.25}(OH)_2CO_3^{2-}{}_{0.125} \cdot 0.5H_2O$ | single | observed | 94 | 7.2 |

*indicates comparative examples.

The results shown in Table 1 indicate that the samples A2 to A7 and A9 to A12 in which the $Mg^{2+}$ and $Al^{3+}$ at Mg thickness. The resultant green body was dried at 80° C. for 12 hours and then fired at a temperature shown in Table 2 for three hours, to prepare a zirconia porous substrate. Thereafter, the zirconia porous substrate was shaped into a size of 2 cm×2 cm×0.3 cm.

The porosity at the surface of each of the resultant porous substrates was determined by a method involving image processing. The results are shown in Table 2. Specifically, the porosity was determined as follows: 1) an electron microscopic image of the surface microstructure of the porous substrate was taken with a field emission scanning electron microscope (FE-SEM) for sample B1 or a scanning electron microscope (SEM; JSM-6610LV, manufactured by JEOL Ltd.) for samples B2 to B5 at a magnification of 10,000 or more (for samples B2 to B5) or 100,000 (for sample B1) at an acceleration voltage of 1 kV (for sample B1) or 10 to 20 kV (for sample B2 to B5); 2) the grayscale electron microscopic image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 600 nm×600 nm area of the surface of the porous substrate (for sample B1) or a 6 μm×6 μm area of the surface of the porous substrate (for samples B2 to B5).

The average pore size of each porous substrate was determined. The results are shown in Table 2. In the present invention, the average pore size was determined by measuring the largest length of each pore in an electron microscopic (FE-SEM or SEM) image of the surface of the porous substrate. The magnification of the electron microscopic (FE-SEM or SEM) image used in this measurement was 100,000 (for sample B1) or 20,000 (for samples B2 to B5). All the measured pore sizes were listed in order of size to calculate the average, from which the subsequent 15 larger sizes and the subsequent 15 smaller sizes, i.e., 30 sizes in total, were selected in one field of view. The selected sizes of two fields of view were then averaged to yield the average pore size. The pore sizes were measured by, for example, a length-measuring function of FE-SEM or SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 75 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon (registered trademark) container (with an internal volume of 100 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane samples B1 to B5"). The thickness of the membrane sample was about 1.5 μm. Layered-double-hydroxide-containing composite material samples (hereinafter referred to as "composite material samples B1 to B5") were thereby prepared. LDH dense membranes were formed on the opposite surfaces of the porous substrate. In order to use the composite material as a separator, the LDH dense membrane on one surface of the porous substrate was mechanically removed.

Example B2: Identification of Membrane Sample (Reference)

Figure 4:
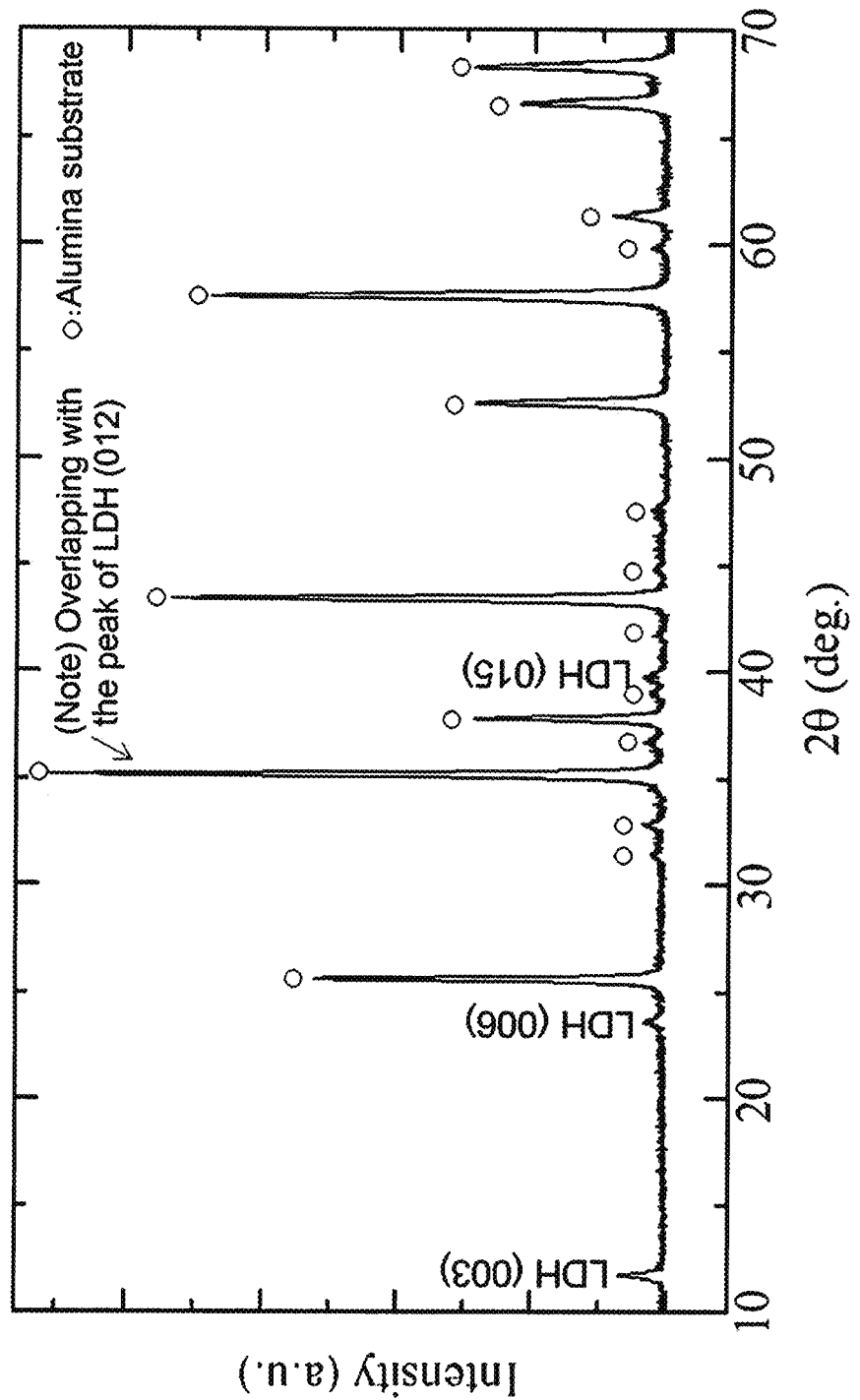
FIG. 4 is an XRD profile of a sample of Example B2 in its crystalline phase.

A crystalline phase of membrane sample B2 was analyzed with an X-ray diffractometer (RINT-TTR III, manufactured by Rigaku Corporation) at a voltage of 50 kV, a current of 300 mA, and a measuring range of 10° to 70°. The resultant XRD profile is shown in FIG. 4. This XRD profile was compared with the diffraction peaks of a layered double hydroxide (or a hydrotalcite compound) described in JCPDS card No. 35-0964, and membrane sample B2 was identified as a layered double hydroxide (LDH, or a hydrotalcite compound). As shown in the XRD profile of FIG. 4, peaks derived from alumina in the porous substrate on which membrane sample B2 was formed (i.e., the peaks marked with a circle in FIG. 4) were also observed. Membrane samples B1 and B3 to B5 were also identified as a layered double hydroxide (LDH, or a hydrotalcite compound).

Example B3: Observation of Microstructure (Reference)

Figure 5:
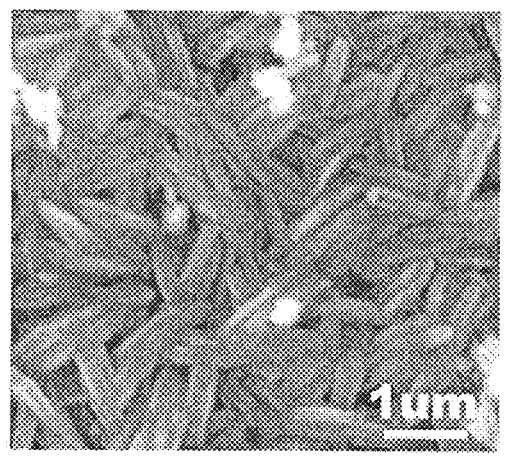
FIG. 5 is an SEM image of a surface microstructure of a membrane sample observed in Example B3.

The surface microstructure of membrane sample B2 was observed with a scanning electron microscope (SEM; JSM-6610LV, manufactured by JEOL Ltd.) at an acceleration voltage of 10 to 20 kV. FIG. 5 illustrates the resultant SEM image (i.e., a secondary electron image) of the surface microstructure of membrane sample B2.

Figure 6:
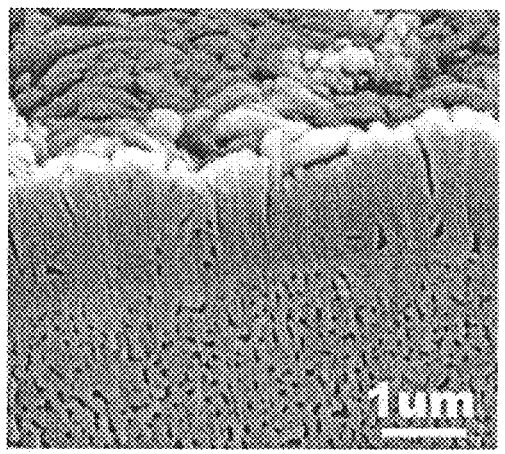
FIG. 6 is an SEM image of a microstructure of a polished cross-section of a composite material sample observed in Example B3.

A cross-section of composite material sample B2 was subjected to CP polishing, and the microstructure of the polished cross-section was observed with a scanning electron microscope (SEM) at an acceleration voltage of 10 to 20 kV. FIG. 6 illustrates the resultant SEM image of the microstructure of the polished cross-section of composite material sample B2.

Example B4: Measurement of Porosity (Reference)

The porosity at the surface of membrane sample B2 was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of membrane sample B2 was also determined. The porosity was determined as in the determination of porosity of the membrane surface in Example B3, except for taking an electron microscopic (SEM) image of the polished cross-section along the thickness of the membrane at a magnification of 10,000 or more. The determination of the porosity was performed on the area of the membrane sample of the polished cross-section. The porosity at the polished cross-section of membrane sample B2 was 3.5% on average (i.e., the average porosity of the membrane areas of three polished cross-sections). The results demonstrate a significantly high density of the membrane formed on the porous substrate.

Example B5: Evaluation of Density (Reference)

Figure 7A:
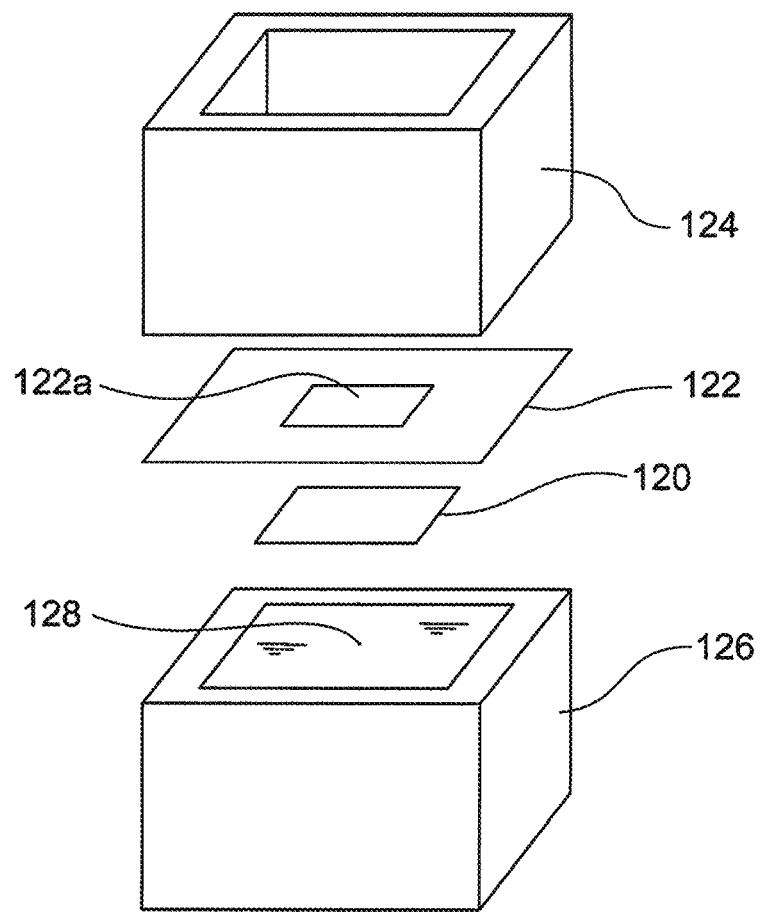
FIG. 7A is an exploded perspective view of a system for evaluating and measuring density in Example B5.
Figure 7B:
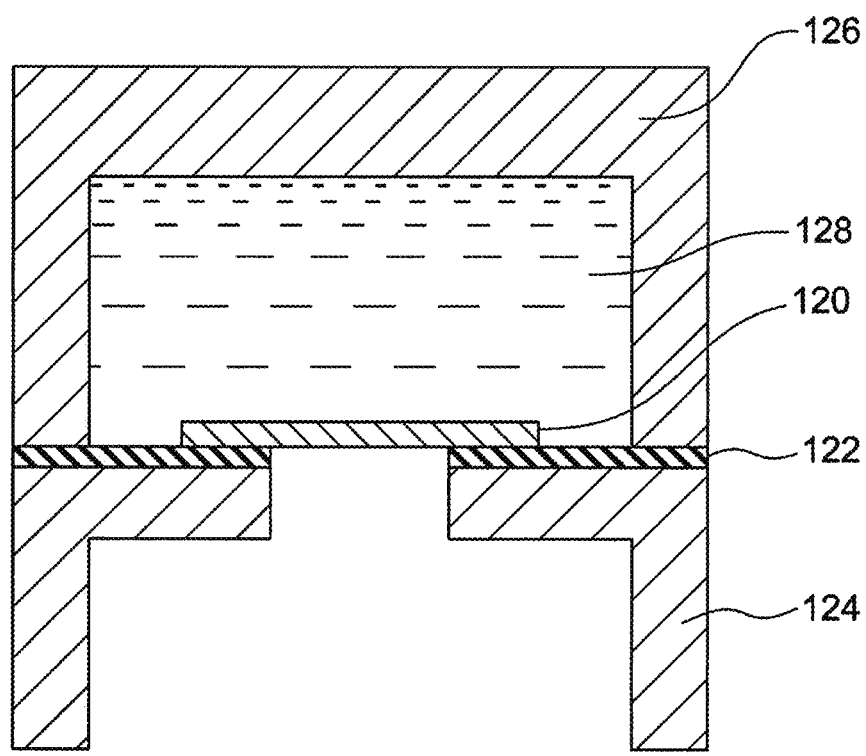
FIG. 7B is a schematic cross-sectional view of a system for evaluating and measuring density in Example B5.

A density evaluation test was performed on membrane samples B1 to B5 for determining whether these samples have high density and thus water impermeability. With reference to FIG. 7A, a silicone rubber sheet 122 having a central opening 122a (0.5 cm×0.5 cm) was bonded to the membrane sample of composite material sample 120 prepared in Example B1 (cut into a piece of 1 cm×1 cm), and the resultant laminate was disposed between two acrylic units 124 and 126 and bonded to these acrylic units. The acrylic unit 124 disposed on the silicone rubber sheet 122 has no bottom, and thus the silicone rubber sheet 122 is bonded to the acrylic unit 124 such that the opening 122a is exposed. The acrylic unit 126 disposed on the porous substrate of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. After formation of the assembly, the total weight thereof was measured. It should be noted the unit 126 has a closed vent (not shown) and the vent is opened after inversion of the assembly. As illustrated in FIG. 7B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. No change in weight of the ion-exchange water was observed even after the one-week test at 25° C. The results demonstrate that membrane samples B1 to B5 (i.e., functional membranes) exhibit high density and thus water impermeability.

TABLE 2

| Sample No. | Porous substrate | | | | LDH |
| | Substrate | Firing temperature (° C.) | Pore size (μm) | Porosity (%) | Membrane Water permeability |
| --- | --- | --- | --- | --- | --- |
| B1 | Alumina | 1100 | 0.02 | 27.2 | No |
| B2 | Alumina | 1150 | 0.1 | 24.6 | No |
| B3 | Alumina | 1200 | 0.6 | 19.3 | No |
| B4 | Zirconia (3YSZ) | 1100 | 0.3 | 44.5 | No |
| B5 | Zirconia (8YSZ) | 1100 | 0.2 | 51.9 | No |

What is claimed is:

1. A layered double hydroxide represented by the following formula:

$$[Mg^{2+}_{(1-y)}M1^{\alpha+}_{y}]_{1-x}[Al^{3+}_{(1-z)}M2^{\beta+}_{z}]_x(OH)_2A^{n-}_{x/n} \cdot mH_2O$$

wherein $0.1 \leq x \leq 0.4$, $0 \leq y \leq 0.95$, and $0 \leq z \leq 0.95$, with the proviso that both y and z are not 0 at the same time; $\alpha=1$ or 2; $\beta=2$ or 3; $A^{n-}$ is an n-valent anion, with the proviso that n is an integer of 1 or greater; $m \geq 0$; $M1^{\alpha+}$ is a cation of at least one substituent element selected from the group consisting of monovalent elements, transition metal elements, and other elements with an ionic radius greater than that of $Mg^{2+}$; and $M2^{\beta+}$ is a cation of at least one substituent element selected from the group consisting of divalent elements, transition metal elements, and other elements with an ionic radius greater than that of $Al^{3+}$.

2. The layered double hydroxide according to claim 1, wherein $M1^{\alpha+}$ comprises at least one cation selected from the group consisting of $Li^+$, $Co^{2+}$, $Ni^{2+}$, $Mn^{2+}$, $Cu^{2+}$, and $Zn^{2+}$.

3. The layered double hydroxide according to claim 1, wherein $M2^{\beta+}$ comprises $Fe^{3+}$.

4. The layered double hydroxide according to claim 1, wherein $A^{n-}$ comprises $OH^-$ and/or $CO_3^{2-}$.

5. A layered double hydroxide dense membrane that is a water-impermeable dense membrane comprising the layered double hydroxide according to claim 1.

6. The layered double hydroxide dense membrane according to claim 5, wherein the layered double hydroxide comprises an agglomeration of platy particles, and the platy particles are oriented such that the tabular faces of the platy particles are perpendicular to or oblique to the surface of the dense membrane.

7. The layered double hydroxide dense membrane according to claim 5, which has a thickness of 100 μm or less.

8. A composite material comprising a porous substrate and a layered double hydroxide dense membrane according to claim 5, the layered double hydroxide dense membrane being disposed on at least one surface of the porous substrate.

9. The composite material according to claim 8, wherein the porous substrate comprises at least one material selected from the group consisting of ceramic materials, metal materials, and polymer materials.

10. The composite material according to claim 8, wherein the porous substrate is composed of a ceramic material, wherein the ceramic material is at least one selected from the group consisting of alumina, zirconia, titania, magnesia, spinel, calcia, cordierite, zeolite, mullite, ferrite, zinc oxide, and silicon carbide.

11. The composite material according to claim 8, wherein the porous substrate has an average pore size of 0.001 to 1.5 μm.

12. The composite material according to claim 8, wherein the surface of the porous substrate has a porosity of 10 to 60%.

* * * * *